United States Patent Office 3,715,335
Patented Feb. 6, 1973

3,715,335
LINEAR POLYESTER BACKBONE QUATERNARY AMMONIUM POLYELECTROLYTES
Robert Bacskai, Kensington, Calif., assignor to Chevron Research Company, San Francisco, Calif.
No Drawing. Continuation-in-part of application Ser. No. 23,029, Mar. 26, 1970. This application Mar. 4, 1971, Ser. No. 121,184
Int. Cl. C08g *17/14*
U.S. Cl. 260—75 N                                            4 Claims

ABSTRACT OF THE DISCLOSURE

Cationic polyelectrolytes having a linear polyester backbone with attached side chains containing quaternary ammonium epoxide groups and optional hydroxyl or primary amine groups.

CROSS-REFERENCE TO RELATED APPLICATION

This application is a continuation-in-part of U.S. application Ser. No. 23,029, filed Mar. 26, 1970 and now abandoned.

BACKGROUND OF THE INVENTION

This invention relates to novel linear polyester backbone quaternary ammonium polyelectrolytes. More particularly, the invention is concerned with cationic polyelectrolytes having a linear polyester backbone with attached side chains containing quaternary ammonium epoxide groups and optional hydroxyl or primary amine groups.

Polyelectrolytes are a well known class of chemical compounds. Both cationic and anionic polyelectrolytes are known, the polyelectrolytes being classified according to the charge on the large, generally polymeric backbone. The cationic polyelectrolytes have positively charged centers such as quaternary ammonium groups spread throughout the polymer. Such cationic polyelectrolytes have been suggested for water clarification. Still other cationic polyelectrolytes have been suggested as paper sizing additives and as flocculating agents.

SUMMARY OF THE INVENTION

In accordance with the present invention novel cationic polyelectrolytes are provided in a new class of polymers having a linear polyester backbone to which side chains are attached through an amine linkage, said side chains consisting of linear or cyclic alkylene groups of 2 to 6 carbon atoms and having a glycidyl quaternary ammonium halide group attached thereto. Optionally additional amine-linked side chains may be present having both hydroxyl and free primary amino groups attached thereto.

The novel cationic polyelectrolytes of the invention have been found to be useful for imparting increased strength to wet paper when present in amounts of from about 0.05% to 5% by weight based on the paper. The polyelectrolytes having the optional side chains are particularly useful because they improve both the wet strength of the paper product and the processability of the paper pulp during that stage of production.

DESCRIPTION OF THE PREFERRED EMBODIMENTS

The novel cationic polyelectrolytes of the present invention are prepared by reacting a polymer of the formula:

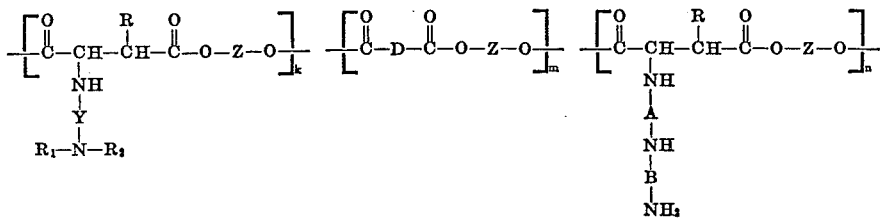

with an epihalohydrin. The product of this reaction probably has the following structure:

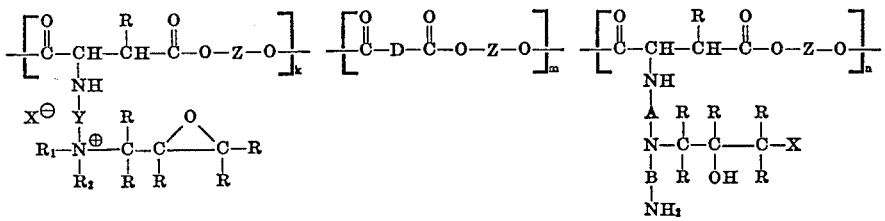

wherein:
R is H or methyl.
$R_1$ and $R_2$ are alkyl groups of 1 to 6 carbons or are joined together with the nitrogen atom to form 5- or 6-membered heterocyclic rings.
Y is a linear or cyclic alkylene diradical of 2 to 6 carbon atoms.
Z is a linear or cyclic alkylene diradical of 2 to 6 carbon atoms, —$CH_2CH_2$—O—$CH_2CH_2$—, or

—$CH_2CH_2$—O$)_2CH_2CH_2$—

X is chlorine or bromine.
D is a linear or cyclic alkylene diradical of 2 to 6 carbons or a phenylene diradical.
A and B are linear or cyclic alkylene diradicals of 2 to 6 carbons, are joined together with the common nitrogen atom to form a 5- or 6-membered heterocyclic ring, or are —$CH_2CH_2$—NH—$CH_2CH_2$—.
k is an integer from 2 to 60, m is an integer from 0 to k, n is 0 or k, and the sum of k, m, and n is from 4 to 60.

It is understood that the polymers of this invention contain the bracketed structures in random arrangement, except for the case in which m and n are zero. The chains of such polymers are terminated by either a carboxyl or a hydroxyl group, depending on the relative amounts of dibasic acid and dihydric alcohol charged to the process. However, the nature of these end groups in the polyelectrolytes of this invention is not critical and may be either one or mixtures thereof.

The cationic polyelectrolytes of the present invention are prepared by adding a compound containing both primary and tertiary amino groups (primary/tertiary diamine) to an unsaturated polyester. The primary amino group adds across the double bond thereby forming a side chain having attachment to the polyester backbone through a secondary nitrogen atom and further characterized in having a tertiary nitrogen group in said side chain. This is shown by the following chemical equation:

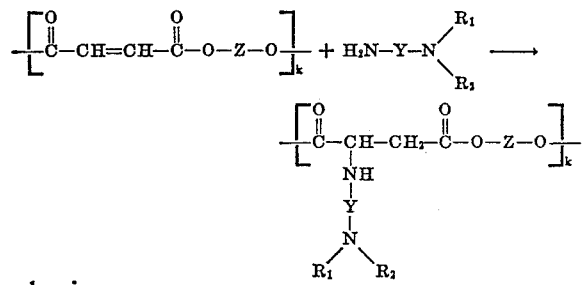

wherein:
$R_1$ and $R_2$ have the same meaning as before.
Z and Y are connecting groups.
$k$ is a number in the range of 4 to 60.

The multiple side chain-containing polyester is then further reacted with an epichlorohydrin-type compound thereby forming a quaternary nitrogen group in a number of said side chains and, at the same time, incorporating an equal number of epoxide groups. This is shown by the following chemical equation:

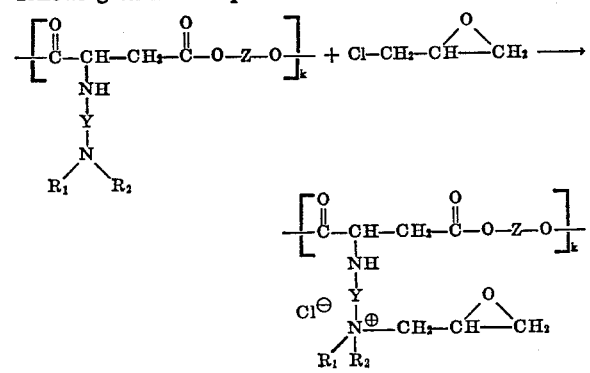

wherein: $R_1$, $R_2$, Y, Z, and $k$ have the same meaning as before.

In the practice of this invention, it is not necessary to add one amine molecule at every point of unsaturation. As many as 50% of the double bonds may be left unreacted. However, it is preferred that over 75% of the double bonds be utilized for side chain attachment and even more preferred that essentially all double bonds are converted to side chain attachment.

In one optional embodiment of the present invention, only about one-half of the double bonds are reacted with the primary/tertiary diamine; and the remainder of the double bonds are reacted with about an equal molar amount of a compound containing two primary and at least one secondary amino group (primary/secondary triamine). Then epichlorohydrin is added to form an epoxide-containing quaternary amine side chain and a hydroxy-containing side chain. This is shown by the following chemical equations:

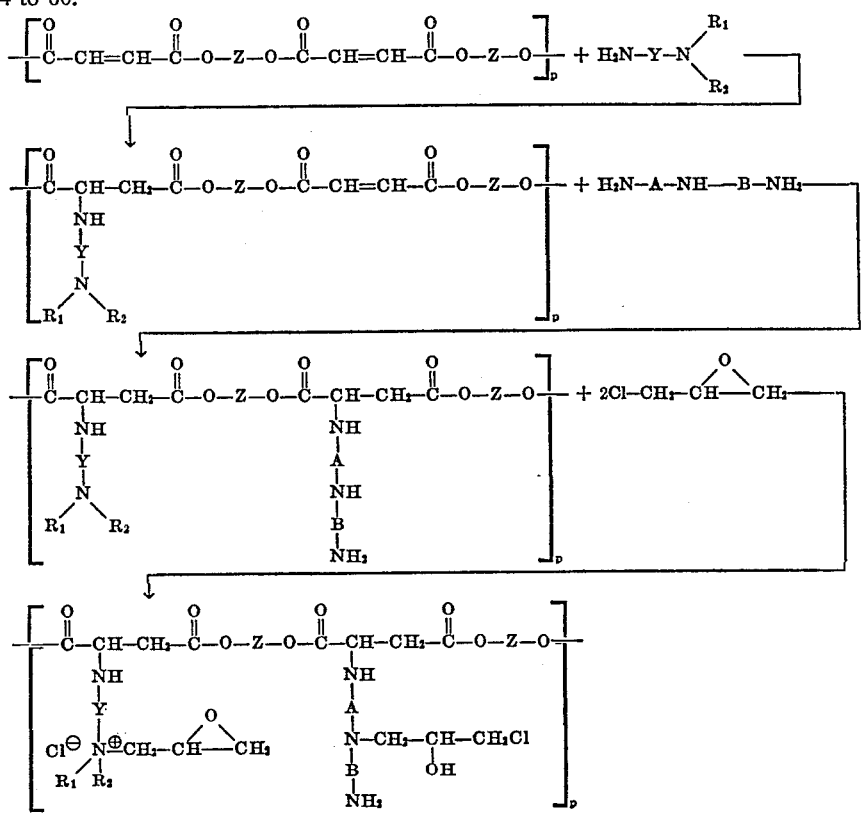

wherein:

$R_1$, $R_2$, Y, and Z have the same meaning as before.
A and B are connecting groups.
$p$ has a value from 2 to 30.

The quantity of epihalohydrin added to amine-containing polyester of this invention is based on the number of primary/tertiary diamine groups incorporated into the polymer. Sufficient halohydrin is added to react with at least 25%, preferably 50%, of the tertiary nitrogen atoms present. In general, polyesters having a relatively low concentration of attached tertiary nitrogen atoms will be reacted with relatively large amounts of epihalohydrin, usually in an amount sufficient to react with 75% or more of the nitrogen atoms. In the optional embodiment of the invention, in which a primary/tertiary diamine and a primary/secondary triamine are both attached to the polyester backbone, the amount of epihalohydrin employed will be in a molar amount equal to the sum of the two attached amino compounds.

The unsaturated polyesters suitable for use in this invention are those polyesters prepared from an α,β-unsaturated dicarboxylic acid or anhydride and a diol-containing compound. The unsaturated compounds useful in making these polyesters include maleic, fumaric, mesaconic, and citraconic acids and maleic anhydride. Maleic anhydride is preferred. The polyester may optionally contain saturated dibasic acids, up to about 1 mole of saturated acid per mole of unsaturated acid, preferably less. Saturated acids satisfactory for this use may have the formula:

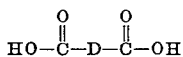

wherein: D is a linear or cyclic alkylene diradical of 2 to 6 atoms or a phenylene diradical.

These include the phthalic acids, the various α,ω-aliphatic diacids having from 2 to 8 carbon atoms, e.g., oxalic, malonic, succinic, glutaric, and adipic acids, the alkyl and alkenyl substituted aliphatic dibasic acids having a total of 8 carbon atoms such as methyl malonic acid, ethyl succinic acid, isobutenyl succinic acid, allyl succinic acid, etc. The diol portion of the polyester has the general formula:

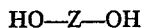

wherein: Z is a connecting group of 2 to 6 carbon atoms, said connecting group being a linear or cyclic alkylene diradical or having one of the following structures:

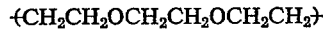

Typical dihydroxy-containing compounds used in preparing the polyesters of this invention include 1,4-cyclohexanediol, ethylene glycol, diethylene glycol, 1,4-butanediol, 1,2-propane diol, neopentyl glycol, and the like. The preferred diol is diethylene glycol.

The unsaturated polyesters of this invention are prepared in the usual fashion by condensation of the unsaturated acid with the dihydroxy alcohol as is well described in the art (Principles of Polymer Chemistry, pages 273 et seq., Paul J. Flory, Cornell University Press, Ithica, N.Y., 1953). Accordingly, the reaction is carried out by mixing essentially equimolar amounts of the dibasic acid and the diol and heating this mixture to a temperature in the range of 150° C. to 250° C. in an atmosphere of an inert gas. Conveniently an esterification catalyst, such as an acid salt, is used to increase the rate of reaction. The water formed during reaction is continuously removed by distillation. The course of the reaction is followed by acid number determination and is continued until the acid number is less than 50, preferably less than 30. This results in a polyester having a molecular weight in the range of 500 to 5000, preferably 1000 to 3000.

The primary/tertiary diamine used in the present invention is a compound having one primary amino group connected to one tertiary amino group and has the general structure:

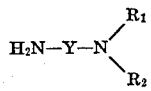

wherein: Y is the connecting group; and $R_1$ and $R_2$ are low molecular weight alkyl groups of 1 to 6 carbon atoms or when taken together with the nitrogen atom to which they are attached are 5- or 6-membered heterocyclic radicals such as piperidino, morpholino, etc. The connecting group Y is a linear or cyclic alkylene diradical of 2 to 6 carbon atoms.

Suitable primary/tertiary diamines include 2-dimethylaminoethylamine, 3 - diethylaminopropylamine, 4-dimethylaminocyclohexylamine, 3 - piperidinopropylamine, 2-morpholinoethylamine, and 2-pyrolidinopropylamine. 3-dimethylaminopropylamine is the preferred compound.

The optional primary/secondary triamine has the formula:

wherein: A and B are connecting groups, which are independently, alkylene diradicals of 2 to 6 carbon atoms, nitrogen-containing diradicals having the structure —CH$_2$CH$_2$—NH—CH$_2$CH$_2$—, or may be connected to form, along with the common nitrogen atom, a 5- or 6-membered ring.

Typical compounds include 2-aminoethyl 3-aminopropyl amine, 2-aminobutyl 6-aminohexyl amine, diethylene triamine, triethylene tetramine, tetraethylene pentamine, and 3,5-diamino piperidine. The preferred compound is diethylene triamine.

The epoxide compounds used in this invention are of the epihalohydrin type and have the following structure:

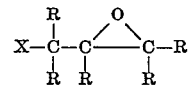

wherein:
X is chlorine or bromine.
R is H or methyl.

The preferred epoxide is epichlorohydrin.

The cationic polyelectrolytes of the present invention are prepared by first mixing the unsaturated polyester and the primary/tertiary diamine, then if desired the primary/secondary triamine is added. The amine modified polyester is next dissolved in a solvent and the epihalohydrin added. The resulting solution is adjusted to a pH of 7 or less and then is ready for dilution and use in paper making.

The first step in the preparation, i.e., addition of a primary/tertiary diamine to the unsaturated polyester, may be carried out in a solvent or preferably without a solvent. Suitable solvents include dioxane, tetrahydrofuran, and dimethylformamide. The reaction is somewhat slower in a solvent than it is when carried out neat. In working without a solvent, the polyester may be warmed to reduce viscosity and to permit good mixing. If possible, the reactants are mixed at room temperature. The reaction is exothermic and is preferably held to a temperature within the range of 80° C. to 120° C. The reaction is usually complete within 1 to 60 minutes.

The addition of the primary amines to the double bonds of the unsaturated polyester results in a net reduction in the number of double bonds. This loss of double bond character may be observed in NMR spectra taken at various times during reaction. When successive spectra are the same, then the reaction is complete. In one embodiment of the present invention a molar amount, based on moles of unsaturation in the polyester, of a primary/tertiary diamine is charged to the reaction; in this case the reaction is complete when the NMR spectrum shows no more double bonds.

In the optional embodiment of the present invention, less than a molar amount, based on moles of unsaturation in the polyester, of the primary/tertiary diamine is employed in the initial reaction. That is, not all of the double bonds of the polyester are utilized in the first reaction. The remainder of the double bonds are then reacted with a primary/secondary triamine. The reaction of this second type of amine may also be carried out in a solvent or preferably without a solvent. The same solvents, reaction conditions, etc., as described for the initial amine reaction also apply to this second amine reaction. Again the course of reaction is followed by NMR spectra.

The quantity of primary/tertiary diamine to be added to the unsaturated polyester is based on the number of moles of unsaturation in said polyesters. Satisfactory polyelectrolytes can be prepared from a polyester in which as little as 25% of the double bonds have been reacted. However, it is preferred that at least 50% of the double bonds be reacted with a primary/tertiary diamine. When this type of diamine is the sole amine to be incorporated, then preferably 75% to 100% of the double bonds are utilized.

In the optional product, in which both a primary/tertiary diamine and a primary/secondary triamine are incorporated, it is necessary that these two amines be present in nearly equal molar amounts. For satisfactory cationic polyelectrolytes for use in papermaking, the mole ratio of the two amines must be in the range of 1.1:1 to 1:1.1, preferably 1:1. Furthermore, since the primary/secondary triamine has two primary amino groups, care must be exercised to prevent undue crosslinking as would occur upon reaction of each primary amine group in one molecule with separate unsaturated polyester chains. This is done by carrying out the reaction in two discrete steps. First, the polyester is reacted with the primary/tertiary diamine and then, secondly, with the primary/secondary triamine. Furthermore, it is necessary in the second step to charge to the reaction 1 mole of triamine for each mole of double bond unsaturation remaining after the initial diamine reaction. The second reaction is continued until the NMR spectra show no more double bonds.

In the preferred method of operation, 50% of the double bonds are utilized by reaction with a diamine and 50% are utilized by reaction with a triamine. As a consequence, there is an unreacted primary amine group at the end of each primary/secondary triamine chain incorporated in the polymer. In the preferred case the number of unreacted primary amine groups is equal to the number of tertiary amine groups incorporated in the first step of the preparation.

Finally, the polyester, modified with either one or two types of amine is quaternized by reaction with an epihalohydrin. The epihalohydrin is added in a molar amount equal to the total number of moles of amine-containing compounds incorporated in the polyester. In general, the modified polyester is too viscous to mix neat with the epihalohydrin and upon partial mixing tends to gel. Therefore, it is preferred to carry out this reaction in a solvent. If a solvent system was used in the amine/polyester reactions, then the same solvent or water diluted solvent may be used in this reaction. In those cases in which no solvent was used in the amine/polyester reactions, water is the preferred solvent. Sufficient water is added to just solubilize the modified polyester and to permit easy stirring. This will generally result in a solution having 20% to 40% by weight of water. Upon dissolution, an epihalohydrin is added. The reaction is exothermic, and the temperature is maintained at or below 60° C. by cooling. As the reaction proceeds, the viscosity of the system increases. Reaction is continued until a 50% aqueous solution has a viscosity greater than K, preferably greater than L on the Gardner scale. The reaction is stopped by adding an acid until the pH reaches a value below 7, preferably in the range of 2 to 4. Any mineral acid or acetic acid may be used, but concentrated hydrochloric acid is preferred.

The above prepared product is now ready for use in the papermaking art. Generally a very dilute aqueous solution is employed, i.e., a solution having about 0.1% to 10% cationic polyelectrolyte. This solution may be added at any point in the papermaking process before the wet pulp is converted into a sheet. Thus, it may be mixed with the wet pulp in the headbox, in the beater, or in the hydropulper. Sufficient solution is added to give a final concentration of polyelectrolyte of 0.05% to 5%, preferably 0.5% to 2% by weight based on the dry weight of the paper pulp in the finished sheet.

The following examples are further illustrative of the novel polymers of this invention. Unless otherwise specified, the proportions in the illustrative examples are on a weight basis.

Example 1.—Preparation of an unsaturated polyester

A round bottom flask equipped with stirrer, thermometer, gas inlet tube, and a hot reflux condenser with water trap was charged with 116.7 grams (1.1 mole) of diethylene glycol and 98.05 grams (1.0 mole) of maleic anhydride. This mixture was heated with stirring under a nitrogen atmosphere for 7 hours at 200–210° C. At the end of this time 17 ml. of water had been removed and the acid number was 21.7.

Example 2.—Addition of 3-dimethylaminopropylamine to an unsaturated polyester

The polyester prepared in Example 1, 196 grams (1.0 mole) was heated to 100° C., and then 100 grams (1.0 mole) of 3-dimethylaminopropylamine was added dropwise over a period of 32 minutes. During this time the temperature rose to 116° C. After all diamine was added the mixture was stirred for an additional 17 minutes at 110° C. An infrared spectrum of the product dissolved in either dioxane or chloroform showed the complete absence of carbon-carbon double bonds. An NMR spectrum showed that the olefinic protons attributed to cis and trans hydrogens at 6.24 p.p.m. and 6.81 p.p.m. downfield from tetramethylsilane in deuterated chloroform had completely disappeared.

Example 3.—Addition of epichlorohydrin to a single amine-containing polyester (a) The product of Example 2, 28.6 grams (0.1 mole) was dissolved in 10 ml. of water. Then 4.95 grams (0.05 mole) of epichlorohydrin was added dropwise over a period of 30 minutes. During this time the temperature rose from 28° C. to 41° C. At the end of this time, 36.4 grams of aqueous hydrochloric acid (containing 12 ml. of concentrated HCl) was added to give a solution having a pH of 2. This solution had a Gardner viscosity of L–M.

(b) In another example using the same procedure as above, 28.6 grams (0.1 mole) of the polymer and 92.5 grams (0.1 mole) of epichlorohydrin were reacted to form a quaternized nitrogen-containing polymer. The Gardner viscosity of the product in a 57% aqueous solution was W.

Example 4.—Addition of both 3-dimethylaminopropylamine and diethyltriamine to an unsaturated polyester (a) A unsaturated polyester was prepared by the same procedure as Example 1, but the acid number was 15.1. This polyester, 196 grams (1.0 mole), was heated to 80° C., and then 51 grams (0.5 mole) of 3-dimethylaminopropylamine was added dropwise over a period of 17 minutes. During this time the temperature rose to 95° C. Then 51.5 grams (0.5 mole) of diethylaminotriamine was added dropwise over a period of 17 minutes. During this time the temperature rose to 110° C. After all triamine was added the reaction mixture was stirred an additional 8 minutes at 105° C.

The same reaction was carried out using the following molar amounts of 3-dimethylaminopropylamine (3-DPA) and of the indicated amine, based on 1 mole of unsaturated polyester.

| Example Number: | 3-DPA, mole | Second amine | Moles |
|---|---|---|---|
| 4b | 0.25 | Diethylenetriamine | 0.5 |
| 4c | 0.5 | ___do___ | 0.25 |
| 4d | 0.5 | Triethylenetetramine | 0.5 |
| 4e | 0.5 | Ethylenediamine | 0.5 |
| 4f | 0 | Diethylenetriamine | 0.5 |
| 4g | 0 | ___do___ | 1.0 |
| 4h | [1] 0 | ___do___ | 0.5 |

[1] Used 0.5 mole of butylamine in place of 3-dimethylaminopropylamine.

Example 5.—Addition of epichlorohydrin to a polyester having two different amine groups (a) The amine modified polyester of Example 4a, 28.8 grams (0.1 mole) was dissolved in 10 ml. of water at room temperature. Then 9.25 grams (0.1 mole) of epichlorohydrin was added over a period of 5 minutes. The resulting mixture was stirred for a total of 40 minutes. The temperature rose to 49° C. after 15 minutes of stirring and then slowly dropped to 35° C. at the end of the stirring time. Then 28.1 grams of aqueous hydrochloric acid (containing 8 ml. of concentrated HCl) was added, and the resulting 50% solution was cooled to room temperature. This solution had a Gardner viscosity of M–N.

Using the same procedure as above, each of the amine modified polyesters of 4b through 4h was reacted with epichlorohydrin in a molar amount equal to the total moles of amine compound(s) used in modifying the polyester. The products of these reactions are Examples 5b through 5h, respectively.

The novel linear polyester backbone quaternary ammonium polyelectrolytes in accordance with this invention were evaluated for flocculating and paper wet-strength properties in a number of tests.

Flocculation tests.—This test simulates a water clarification treatment. The test materials in 1% aqueous solutions are added dropwise to 100 grams of water containing 1 gram of kaolin. The number of drops of test solution required to cause flocculation is measured. More than 2 drops is considered unsatisfactory. The results of this test are given in Table I.

Paper wet strength test.—Kraft paper handsheets were prepared in which varying quantities of the product of Example 5b were incorporated in the final product. The strength of the resulting paper was then measured in both the wet and dry state by the method of ASTM D 774–63T. The ratio of wet strength to dry strength for different concentrations of polyelectrolyte was as follows.

| Weight percent of polyelectrolyte: | Wet strength/dry strength, percent |
|---|---|
| 0 | 5 |
| 0.1 | 14 |
| 0.5 | 33 |
| 1.0 | 42 |
| 2.0 | 62 |
| 3.0 | 69 |

Similar handsheets were prepared in which the final paper contained 1% of the product of Examples 5b through 5h and 3a. These sheets were also tested for wet strength and dry strength. The results are given in Table I.

TABLE I.—FLOCCULATION AND WET PAPER STRENGTH

| Product of Example Number: | Flocculation test (number of drops) | Paper wet strength test (wet/dry, percent) |
|---|---|---|
| 3a | 2 | 29 |
| 5a | 2 | 42 |
| 5d | 1 | 42 |
| 5b | 14 | 32 |
| 5c | 8 | 35 |
| 5g | 10 | |
| 5h | >20 | |
| 5e | 15 | 18 |

Examples 3a, 5a, and 5d are cationic polyelectrolytes having compositions within the teachings of the present invention. These examples show both good flocculating ability along with good wet paper strength retention. Examples 5b and 5c show the dramatic reduction in flocculating ability caused by an improper molar balance of the two amines in the optional embodiment of this invention. Examples 5g and 5h show that a polyester modified by primary/secondary triamine either with or without a primary monoamine does not give a satisfactory cationic polyelectrolyte after reaction with epichlorohydrin. Example 5e shows that a primary diamine is not a satisfactory amine for the optimal practice of this invention.

The water treating properties of the novel linear polyester backbone quaternary ammonium polyelectrolytes of the invention were also evaluated in sedimentation and filtration tests.

Sedimentation test.—In papermaking various materials are added to the aqueous pulp to prevent fines from passing through the screen during processing. These materials are known as "fine retention aids." The present test is carried out by adding 1, 2, 3 and 5 drops of 1% aqueous solution of the test material to 100 grams of water containing 1 gram of kaolin in a 100 ml. graduate. Then the graduate is tumbled 5 times and allowed to stand upright for 5 minutes. The quantity of sediment is measured. The greater the sediment the better the performance of the test material as a "fine retention aid." The results are as follows:

| | Sediment [1] after 5 minutes, ml. | | | |
|---|---|---|---|---|
| | 1 dr. | 2 dr. | 3 dr. | 5 dr. |
| Product of Example Number: Commercial: | | | | |
| A | 1 | 11 | 16 | 19 |
| B | 15 | 20 | 21 | 21 |
| 3a | 10 | 20 | 22 | 24 |
| 5a | 9 | 17 | 20 | 22 |

[1] With no additive, there was no sediment after 5 minutes and about 1 ml. after 60 minutes.

Filtration test.—This test was carried out by measuring the volume of filtrate passing through a 7-cm. Whatman No. 2 filter paper in a Buchner funnel under 560 mm. of pressure. The solution used in this test was prepared by mixing 5 grams of kaolin with 100 ml. of water, to which was added 2, 4, and 6 drops of a 1% solution of the test material. This solution was then charged to the Buchner funnel already under pressure and the volume of the filtrate at 2 minutes was determined. The results are as follows:

| | Filtrate [1] after 2 minutes, ml. | | |
|---|---|---|---|
| | 2 dr. | 4 dr. | 6 dr. |
| Product of Example Number: Commercial: | | | |
| A | 24 | 26 | 27 |
| B | 26 | 31 | 37 |
| 3a | 24 | 26 | 29 |
| 5a | 21 | 24 | 27 |

[1] With no additive, the volume of filtrate was 18 ml. after 2 minutes.

This test shows that the cationic polyelectrolytes of the present invention facilitate filtration separation of a liquid having an extremely small particle size contaminant. In paper making this means a faster screen filtration of the wet pulp with the concomitant saving in process time. This improved filtration rate is obtained without the loss of paper fines through the screen. Rather, less fines pass through the screen when utilizing the products of this invention.

The novel linear polyester backbone quaternary ammonium polyelectrolytes in accordance with the invention were evaluated as size retention aids and as filler retention aids in paper manufacture in accordance with the standard test methods.

Size and filler retention test.—Paper handsheets were prepared in the usual way, to incorporate a sizing agent, a filler, and the cationic polyelectrolyte of Example 5a.

These handsheets were then tested for (1) sizing efficiency by the Valley size method, as described in "Pulp and Paper," vol. II, 2d ed., James P. Casey, Interscience Pub., Inc., New York, 1960, p. 1040, (2) wet and dry strengths, and (3) ash content. The results are given in Table II.

TABLE II.—SIZE AND FILLER RETENTION

| Paper additive [1] | Valley size, sec. | Wet strength/ dry strength, percent | Ash, percent |
|---|---|---|---|
| Example: | | | |
| 10a _____ None _____ | 1 | 6 | 0 |
| 10b _____ 1% cationic starch [2] _____ | 2 | 7 | |
| 10c _____ 1% Example 5a _____ | 2 | 45 | |
| 10d _____ 1% cationic starch, 1% sizing agent ASA [3] _____ | 536 | 28 | |
| 10e _____ 1% Example 5a, 1% sizing agent ASA [3] _____ | 1,674 | 68 | |
| 10f _____ 1% cationic starch [2], 1% sizing agent ASA [3], 20% Kaolin ____ | 549 | 26 | 4.7 |
| 10g _____ 1% Example 5a, 1% sizing agent ASA [3], 20% kaolin _____ | 1,358 | 61 | 7.8 |

[1] The below listed additives were added to the wet pulp in the concentrations indicated by weight based on dry paper.
[2] Cationic starch is a commonly used size and filler retention aid.
[3] Sizing agent ASA is an alkenyl succinic anhydride having from 15 to 20 carbons in the alkenyl group.

Example 10b shows that cationic starch is not a sizing agent nor a paper strengthening agent. Example 10c shows that the compounds of this invention are not sizing agents either, but that they do impart increased wet strength to paper. Example 10e compared to Example 10d shows the great improvement in sizing obtained by replacing cationic starch by a compound of the present invention. Both sizing and wet paper strength are significantly better for the paper containing these novel cationic polyelectrolytes. Example 10g compared to Example 10f not only shows the superiority of the instant compounds over cationic starch in sizing and wet paper strength, but also as filler retention aids. Almost twice as much of the filler is incorporated in the paper. This indicates that in the papermaking process, when utilizing the cationic polyelectrolytes of this invention, much smaller quantities of filler and sizing agent need be charged to get the same final paper properties as are now obtained using cationic starch.

The cationic polyelectrolytes of the present invention may be used alone or in conjunction with other additives known in the papermaking art. When used alone, these cationic polyelectrolytes impart improved wet strength to the final paper product. They also effect improvements in the papermaking process, especially in the screen filtration step wherein rapid filtration is promoted and carry through of fine fibers is diminished. The present compounds are not sizing agents; but when used in conjunction with sizing agents, the final paper product has improved sizing as compared with other commercial or potentially commercial polyelectrolytes. When used in conjunction with the usual paper fillers such as clay, talc, calcium carbonate, titanium dioxide, etc., the present compounds effect incorporation of a greater percentage of these fillers from the aqueous pulp system thereby permitting a decreased charge of filler to the process.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. Polymers prepared by reacting a polymer of the formula:

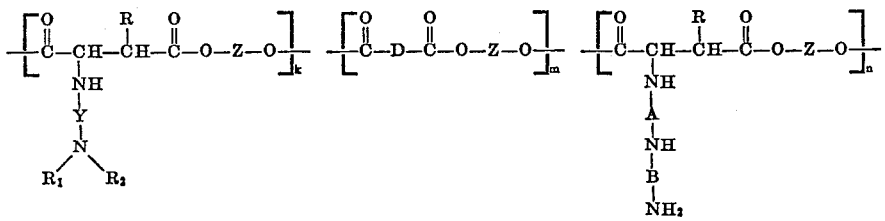

with sufficient epihalohydrin to react with at least 25% of the tertiary nitrogen atoms,
wherein:
R is H or methyl,
$R_1$ and $R_2$ are alkyl groups of 1 to 6 carbons or are joined together with the nitrogen atom to form 5- or 6-membered heterocyclic rings,
Y is a linear or cyclic alkylene diradical of 2 to 6 carbon atoms,
Z is a linear or cyclic alkylene diradical of 2 to 6 carbon atoms, —$CH_2CH_2$—O—$CH_2CH_2$—, or

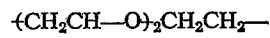

D is a linear or cyclic alkylene diradical of 2 to 6 carbons or a phenylene diradical,
A and B are linear or cyclic alkylene diradicals of 2 to 6 carbons, are joined together with the common nitrogen atom to form a 5- or 6-membered heterocyclic ring, or are —$CH_2CH_2$—NH—$CH_2CH_2$—,
$k$ is an integer from 2 to 60, $m$ is an integer from 0 to $k$, $n$ is 0 or $k$, and the sum of $k$, $m$, and $n$ is from 4 to 60,
said epihalohydrin having the structure:

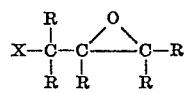

wherein:
X is chlorine or bromine,
R is H or methyl.

2. Polymers in accordance with claim 1 in which the polyester has a molecular weight in the range of about 500 to about 5000.

3. Polymers in accordance with claim 1 in which the linear polyester backbone is derived from maleic anhydride and ethylene glycol.

4. Polymers in accordance with claim 3 in which the amine-linked side chains are derived from 3-dimethylamino propylamine which is then quaternized with epichlorohydrin.

References Cited
UNITED STATES PATENTS
3,533,998  10/1970  Yolles _____ 260—65

MELVIN GOLDSTEIN, Primary Examiner

U.S. Cl. X.R.

162—164; 210—54; 260—29.2 E, EP, N, 75 EP, T